US010314139B2

(12) United States Patent
Subbarayalu Venkitapathi et al.

(10) Patent No.: US 10,314,139 B2
(45) Date of Patent: Jun. 4, 2019

(54) SYSTEM AND METHOD FOR OPTIMIZING DAYLIGHT HARVESTING IN DISTRIBUTED SITES

(71) Applicant: CARRIER CORPORATION, Jupiter, FL (US)

(72) Inventors: Prabhu Raja Subbarayalu Venkitapathi, Coimbatore (IN); Jasmine Singh, Dwarka (IN); Subhasis Mandal, Bangalore (IN); Baijayanta Nath, Kolkata (IN)

(73) Assignee: CARRIER CORPORATION, Jupiter, FL (US)

( * ) Notice: Subject to any disclaimer, the term of this patent is extended or adjusted under 35 U.S.C. 154(b) by 0 days.

(21) Appl. No.: 15/078,712

(22) Filed: Mar. 23, 2016

(65) Prior Publication Data
US 2017/0265271 A1  Sep. 14, 2017

(30) Foreign Application Priority Data

Mar. 11, 2016  (IN) .............................. 201641008654

(51) Int. Cl.
G05D 23/00 (2006.01)
G06F 17/00 (2006.01)
H05B 37/02 (2006.01)
E04D 13/03 (2006.01)
F21S 19/00 (2006.01)

(52) U.S. Cl.
CPC ......... *H05B 37/0218* (2013.01); *E04D 13/03* (2013.01); *F21S 19/005* (2013.01)

(58) Field of Classification Search
CPC ..... H05B 37/0218; E04D 13/03; F21S 19/005
See application file for complete search history.

(56) References Cited

U.S. PATENT DOCUMENTS

| 4,475,536 | A | * | 10/1984 | Dame | ........................ F24J 2/14 126/585 |
| 6,014,845 | A | * | 1/2000 | Jain | ........................ E04D 13/033 359/591 |
| 8,190,301 | B2 | * | 5/2012 | Voysey | .............. H05B 37/0218 340/635 |
| 8,666,559 | B2 | * | 3/2014 | Verfuerth | ........... H05B 37/0209 700/11 |

(Continued)

*Primary Examiner* — Dedei K Hammond
*Assistant Examiner* — Raymond R Chai
(74) *Attorney, Agent, or Firm* — Cantor Colburn LLP

(57) ABSTRACT

A lighting control system for optimizing operation of skylights of distributed sites to facilitate daylight harvesting comprises a processor and a memory communicatively coupled to the processor. The memory stores processor instructions, which causes the processor to identify skylight-linked lighting circuits from a plurality of lighting circuits by analyzing site configuration data, site instrumentation data, and ambient data, and determine interception points configured for each identified skylight-linked lighting circuit to switch from daylight utilization to electric consumption and to switch from electric consumption to daylight utilization. The processor is further caused to derive an optimum logic for the operation of skylight linked lighting circuits based on the interception points and current operating schedule of the skylight linked lighting circuits and optimize the operation of the skylights based on the optimum logic.

18 Claims, 4 Drawing Sheets

(56) References Cited

U.S. PATENT DOCUMENTS

| | | | | |
|---|---|---|---|---|
| 9,078,299 B2 * | 7/2015 | Ashdown | ............... | H05B 37/00 |
| 2007/0189000 A1 * | 8/2007 | Papamichael | ........ | H05B 39/042 |
| | | | | 362/1 |
| 2012/0265350 A1 * | 10/2012 | Ashdown | ........... | H05B 37/0218 |
| | | | | 700/276 |
| 2013/0006437 A1 * | 1/2013 | Verfuerth | ............... | H04W 4/70 |
| | | | | 700/295 |
| 2014/0175985 A1 * | 6/2014 | Billig | ................ | H05B 37/0218 |
| | | | | 315/130 |
| 2015/0309248 A1 * | 10/2015 | Xu | ......................... | G09F 13/14 |
| | | | | 362/607 |

* cited by examiner

SYSTEM AND METHOD FOR OPTIMIZING DAYLIGHT HARVESTING IN DISTRIBUTED SITES

This application claims the benefit of Indian Patent Application Serial No. 201641008654, filed Mar. 11, 2016, which is hereby incorporated by reference in its entirety.

FIELD

This disclosure relates generally to daylight harvesting, and more particularly to a system and method for optimizing usage of one or more skylights in one or more distributed sites to facilitate daylight harvesting.

BACKGROUND

Daylight harvesting enables reduction in energy consumption by utilizing ambient light. Typically, the daylight is harvested using skylights installed in ceiling, glass paneled walls which allow the daylight to enter into an internal space for internal lighting.

However, the conventional methods of facilitating daylight usage for internal lighting are not enabled to detect presence of skylights and further determine optimum level of usage-measurement of daylight input in a facility, appropriate operation through sensor set point, sensor placement, operating range and schedule.

Moreover, the conventional methods for assessing operations of skylights do not take into account multiple factors affecting the functioning of the skylights on a regular basis. Few key problems associated with this are lack of information on lighting circuits operating based on skylights, schedule inefficiency causing skylights to operate in inefficient time range, sensor inefficiency causing high or low cut-off, improper set-point definitions, and lack of operational switchover between available feeders. Thus existing methods of assessing daylight harvesting do not address above factors resulting in a reduced amount of utilization of the daylight leading to higher consumption and possible non-compliance of policy (e.g.: lux levels to be maintained inside the facility).

SUMMARY

In one embodiment, a method for optimizing operation of one or more skylights of one or more distributed sites to facilitate daylight harvesting is disclosed. The method comprises identifying, by a lighting control system, one or more skylight-linked lighting circuits from a plurality of lighting circuits by analyzing at least one of site configuration data, site instrumentation data, or ambient data. The method further comprises determining, by the lighting control system, interception points configured for each identified skylight-linked lighting circuit to switch from daylight utilization to electric consumption and to switch from electric consumption to daylight utilization, wherein the interception points are determined based on at least one of the site configuration data, the site instrumentation data, or the ambient data. Further, the method comprises deriving, by the lighting control system, an optimum logic for the operation of one or more skylight linked lighting circuits based on the interception points and current operating schedule of the skylight linked lighting circuits and optimizing, by the lighting control system, the operation of the one or more skylights based on the optimum logic.

In one embodiment, a lighting control system for optimizing operation of one or more skylights of one or more distributed sites to facilitate daylight harvesting is disclosed. The lighting control system comprises a processor and a memory communicatively coupled to the processor. The memory stores processor instructions, which, on execution, causes the processor to identify one or more skylight-linked lighting circuits from a plurality of lighting circuits by analyzing at least one of site configuration data, site instrumentation data, or ambient data and determine interception points configured for each identified skylight-linked lighting circuit to switch from daylight utilization to electric consumption and to switch from electric consumption to daylight utilization, wherein the interception points are determined based on at least one of the site configuration data, the site instrumentation data, or the ambient data. The processor is further caused to derive an optimum logic for the operation of one or more skylight linked lighting circuits based on the interception points and current operating schedule of the skylight linked lighting circuits and optimize the operation of the one or more skylights based on the optimum logic.

In one embodiment, a non-transitory computer readable storage medium for optimizing operation of one or more skylights of one or more distributed sites to facilitate daylight harvesting is disclosed. The non-transitory computer readable medium when executed by a computing device, cause the computing device to identify one or more skylight-linked lighting circuits from a plurality of lighting circuits by analyzing at least one of site configuration data, site instrumentation data, or ambient data; determine interception points configured for each identified skylight-linked lighting circuit to switch from daylight utilization to electric consumption and to switch from electric consumption to daylight utilization, wherein the interception points are determined based on at least one of the site configuration data, the site instrumentation data, or the ambient data; derive an optimum logic for the operation of one or more skylight linked lighting circuits based on the interception points and current operating schedule of the skylight linked lighting circuits; and optimize the operation of the one or more skylights based on the optimum logic.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for optimizing operation of one or more skylights installed in one or more distributed sites to facilitate daylight harvesting. The system and method may be implemented in a variety of computing systems. The computing systems that can implement the described method(s) include, but are not limited to a server, a desktop personal computer, a notebook or a portable computer, hand-held devices, and a mainframe computer. The solution may be localized through store controllers and building management systems. Although the description herein is with reference to certain computing systems, the system and method may be implemented in other computing systems, albeit with a few variations, as will be understood by a person skilled in the art.

Working of the system and method for optimizing the operation of one or more skylights is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
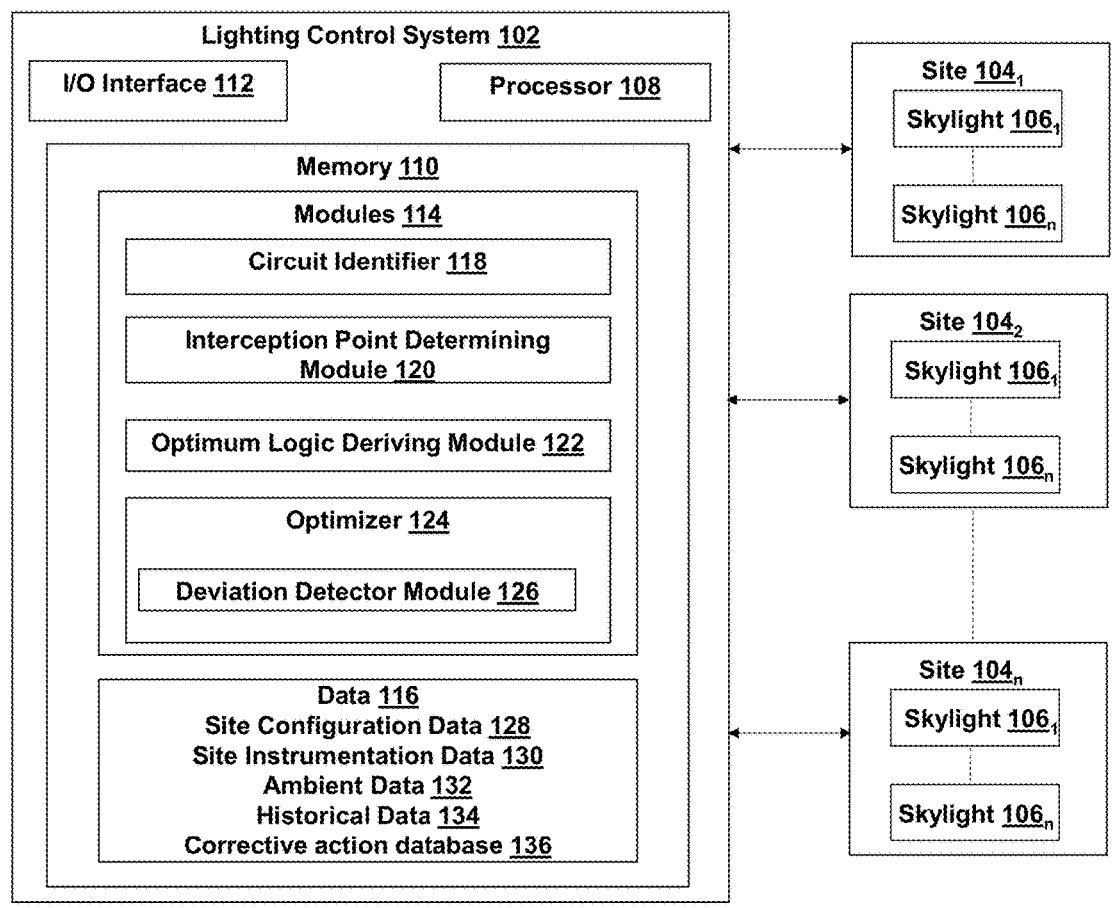
FIG. 1 illustrates an exemplary network implementation comprising a lighting control system for optimizing operation of one or more skylights to facilitate daylight harvesting, according to some embodiments of the present disclosure.

FIG. 1 illustrates an exemplary network implementation 100 comprising a lighting control system 102 for optimizing operation of one or more skylights installed in one or more distributed sites to facilitate daylight harvesting, according to some embodiments of the present disclosure. As shown in FIG. 1, the lighting control system 102 may be communicatively coupled with the one or more sites ($104_1$, $104_2$, ... $104_n$) through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

A site 104 of the one or more sites 104 may be a building or a facility comprising one or more skylights ($106_1$, $106_2$, ... $106_n$). The skylight 106 may comprise a window or glass panels installed in a roof, a ceiling, or walls. The skylight 106 may enable sunlight or daylight to enter inside the site 104 to facilitate daylight harvesting.

As shown in the FIG. 1, the lighting control system 102 comprises a processor 108, a memory 110 coupled to the processor 108, and input/output (I/O) interface(s) 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The I/O interface(s) 112 may include a variety of software and hardware interfaces, for example, a web interface, a graphical user interface, etc., allowing the lighting control system 102 to interact with user devices. Further, the I/O interface(s) 112 may enable the lighting control system 102 to communicate with other computing devices. The I/O interface(s) 112 can facilitate multiple communications within a wide variety of networks and protocol types, including wired networks, for example LAN, cable, etc., and wireless networks such as WLAN, cellular, or satellite. The I/O interface(s) 112 may include one or more ports for connecting a number of devices to each other or to another server.

In one implementation, the memory 110 includes modules 114 and data 116. In one example, the modules 110, amongst other things, include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the data 116 serves, amongst other things, as a repository for storing data fetched, processed, received and generated by one or more of the modules 114. In one implementation, the data 116 may include site configuration data 128, site instrumentation data 130, ambient data 132, historical data 134, and corrective action database 136. In one embodiment, the data 116 may be stored in the memory 110 in the form of various data structures. Additionally, the aforementioned data can be organized using data models, such as relational or hierarchical data models. In an example, the data 116 may also comprise other data used to store data, including temporary data and temporary files, generated by the modules 114 for performing the various functions of the lighting control system 102.

In one embodiment, the data 116 may be provided as an input through the I/O interface 112. In an embodiment, the processor 108 may validate the quality of the data provided as an input to the lighting control system 102. In order to validate the data, one or more data quality parameters may be checked. The one or more data quality parameters may comprise missing data samples, duplicate data samples, and data samples within pre-defined limits. Pre-defined limits may be derived based on type of data point, facility type, operations, dimensions, locations etc. based on the policies, services and end use. Also, in an embodiment, comparison with peer stores and historical data may be used to identify limits for data. Alternatively, the pre-defined limits may be modified through the I/O interface 112 of the lighting control system 102. If data samples are missing or beyond pre-defined limits in the data received as an input, the estimates or calculations performed by the processor 108 based on the data may be affected. Also, missing data samples may result in insufficiency in data for performing analysis. Therefore, the missing data samples and samples beyond predefined limits may be treated by the processor 108 based on the available data samples and a pre-determined data treatment index.

In addition to the derivation of the missing data samples, the duplicate data samples may be eliminated to avoid under-estimations or over-estimations in the calculations performed by the processor 108. In case of duplicate samples, if both the samples are equal, then either of the duplicate samples is removed. However if multiple values exist for the same timestamp, value closer to the predefined limit may be retained.

In addition to the validation of data, the samples are checked for sufficiency of data for analysis. In an embodiment, sufficiency may be checked based on expected number of samples within a given time interval. Also, in another example sufficiency may be checked based on number of data points available to perform the analysis. After validating the data and its sufficiency, the processor 108 may align the data in a pre-defined format for further processing.

In one embodiment, the modules 114 may further include a circuit identifier 118, an interception point determining module 120, an optimum logic deriving module 122, and an optimizer 124. The optimizer 124 may further comprise a deviation detector module 126. In an example, the modules 114 may also comprise other modules. The other modules may perform various miscellaneous functionalities of the lighting control system 102. It will be appreciated that such aforementioned modules may be represented as a single module or a combination of different modules.

In order to optimize the operation of the one or more skylights 106 installed in the one or more sites 104, the circuit identifier 118 may identify one or more skylight-linked lighting circuits or meters from a plurality of lighting circuits by analyzing at least one of site configuration data 128, site instrumentation data 130, or ambient data 132. The site configuration data 128 may comprise lighting schedule, operating schedule, configured interception points, configured set points, and operating pattern of the skylight linked lighting circuits. The site instrumentation data 130 may comprise lighting asset status data (run-hours data), skylight sensor readings, other sensor readings (Internal lux level sensors), dimmer presence, and consumption intensity of lighting circuit. The ambient data 132 may comprise sunrise time, sunset time, outside lux level sensor, cloudiness level, and visibility level.

In an embodiment, the site configuration data 128, the site instrumentation data 130, the ambient data 132, the historical data 134, and the corrective action database 136 may be provided as input by a user on the I/O interface 112 of the lighting control system 102. Alternatively, the site configuration data 128, the site instrumentation data 130, the ambient data 132, the historical data 134, and the corrective action database 136 may be retrieved from the memory 110. In another example, the skylight linked lighting circuit and meter data may already be provided as input by a user on the I/O interface 112 of the lighting control system 102.

In an embodiment, to optimize the operation of the skylights 106, the circuit identifier 118 may identify the skylight linked lighting circuits by monitoring variation in at least one of the consumption intensity of each lighting circuit or the run-hours data, based on at least one of skylight sensor readings, ambient data 132 or site configuration data 128 such as lighting schedule, control set point limits of the skylight linked lighting circuit. For example if the consumption intensity of the lighting circuit increases when the cloudiness level is above a pre-defined cloudiness threshold value and the visibility level is below a pre-defined visibility threshold value, and the consumption intensity of the lighting circuit decreases when the cloudiness level is below the pre-defined cloudiness threshold value and the visibility level is above the pre-defined visibility threshold value, the lighting circuit may be identified as a skylight linked lighting circuit.

In an embodiment, the circuit identifier 118 may identify the skylight linked lighting circuits by monitoring variation in run hours data based on the ambient data 132. The run hour data may include the number of hours for which the lighting circuit is operating. In an example, if the run hour data decreases when the cloudiness level is above a pre-defined cloudiness threshold value and the visibility level is below a pre-defined visibility threshold value, and the run hour data of the lighting circuit increases when the cloudiness level is below the pre-defined cloudiness threshold value and the visibility level is above the pre-defined visibility threshold value, the lighting circuit may be identified as a skylight linked lighting circuit. In an example, Where the lights are operating with no variations in lighting run hours based on skylight sensor readings, cloudiness level, and visibility level then they are related with consumption data of circuits identified operating based on skylights, to detect change in consumption intensity and based on algorithm outcome such facilities are classified as dimmer based skylight operation facility.

The output of this module provides data on lighting circuits associated with skylight operation in a given facility and consumption circuits which are associated with skylight operation in a given facility provided there is significant demarcation available in the physical structure of the facility. In cases where there is no separate demarcation available owing to physical structural limitations in the facility, slight variations in conjunction to regular operations are closely monitored and the segregation is provided.

In an embodiment, the skylight linked lighting circuits may be identified after detecting presence of the one or more skylights 106 in a site 104. The presence of a skylight 106 may be detected by analyzing one of the site configuration data 128, the site instrumentation data 130, the ambient data 132, site satellite images, or street view of the site 104. In an example, the site configuration data 128 may comprise an operating schedule or a layout of a site 104 which may provide data related to the location or spread of the skylights 106 or type of skylights 106, presence of glass walls and their size, in the site 104 or consumption meters associated with skylights. The layout of the site 104 may also provide data related to the number of skylights 106, no. of lighting circuits associated with skylights, present in the site 104 and the area covered by the skylights in the site 104.

In another example, the variation in the consumption intensity of a lighting circuit in correlation with at least one of cloudiness level, visibility level the sunrise time, the sunset time, or skylight sensor readings may show or confirm the presence of a skylight 106 in the site 104. In addition, the variation in lighting asset run hour data in combination with at least one of cloudiness level, the visibility level, the sunrise time, the sunset time, or skylight sensor readings may be used to detect or confirm the presence of the skylights 106. Further, the satellite images of the site 104 may be processed to provide location, spread, area and number of the skylights 106 in the site 104. In addition to the satellite images of the site 104, the street view of the site 104 may be processed to detect the presence of the skylights 106 on the walls in the site 104.

In an embodiment, if skylight sensors are available, the skylight linked lighting circuits may be identified after verifying performance of skylight sensors. The circuit identifier 118 may verify skylight sensor readings associated with the one or more skylights 106 by correlating the skylight sensor readings with at least one of cloudiness level, visibility level, sunset time, or sunrise time. In an example, the skylight sensor reading may be valid if the skylight sensor reading increases after sunrise time and decreases after sunset time. Also, the skylight sensor reading may be verified if the skylight sensor reading increases with increase in the visibility level and decreases with increase in the cloudiness level. Further, this module may also track sensor performance based on historical data to identify issues.

In one embodiment, if the ambient data 132 is not available, the skylight sensor readings may be verified by comparing the skylight sensor readings with local time adjusted skylight sensor readings of a peer site with similar characteristics. The peer sites corresponding to each site 104 may be indexed based on the similarity in the site configuration. In an example, consider that the site 104 is a building situated in a locality. The neighboring buildings in the locality may be indexed based on similarity in the building size, building orientation, and location of skylights in the building, sensor placement, and presence of dimmer or the like.

In one embodiment, the circuit identifier 118 may identify a skylight sensor as a defective sensor if the skylight sensor readings comprises deviation from an optimum skylight sensor reading and accordingly identify a backup strategy for operating skylights. If the % deviation is below a pre-defined threshold value, i.e. the deviation is minor, the skylight sensor may be periodically calibrated remotely based on the identified calibration value, periodicity of which is determined based on % deviation. For example, higher the % deviation, more periodic/frequent is the calibration. In another embodiment, if the % deviation is above the pre-defined threshold value, i.e. the deviation is high, the ambient data 132 may be used to compute a pseudo sensor value. The pseudo sensor value may be further used to operate the skylight linked lighting circuits. In another embodiment, the skylight sensor readings of a peer site 104 may be used as a reference. The peer site 104 may be selected based on location index ranking. In one embodiment, an override schedule may be implemented to address comfort issues or policy issues in a site 104.

After identifying the circuits associated with skylights, the interception point determining module 120 may determine interception points configured for each skylight-linked lighting circuit to switch from daylight utilization to electric consumption and to switch from electric consumption to daylight utilization. Interception point may be defined as the cut-off which triggers operation of daylight usage or shift from day light usage to electric consumption. The interception points may be determined based on at least one of the site configuration data 128, the site instrumentation data 130, or the ambient data 132. The interception points may include a combination of skylight sensor reading (lux level), cloudiness level, and visibility level. In one example, the interception point may be one of a skylight sensor reading, a visibility level, a cloudiness level, (a skylight sensor reading, a visibility level), (a skylight sensor reading, a cloudiness level), and (a visibility level, cloudiness level).

In order to determine the interception point for the skylight sensor reading based on the consumption intensity of a skylight linked lighting circuit (site instrumentation data 130), the skylight sensor reading may be correlated with the consumption intensity of the skylight linked lighting circuit. In one example, a skylight sensor reading at which the consumption intensity of a skylight linked lighting circuit drops below a threshold value, the skylight sensor reading may be determined as an interception point for switching from electric consumption to daylight utilization. Similarly, a skylight sensor reading at which the consumption intensity of a skylight linked lighting circuit is above the threshold value, the skylight sensor reading may be determined as an interception point for switching from daylight utilization to electric consumption. Also, in an embodiment, backup/derived skylight sensor values may be used for determination of interception points. In another example, skylight linked lighting circuit's run-hours data may be used with or without consumption of skylight linked lighting circuit to determine interception points.

Moreover, to determine the interception point for the visibility level, the visibility level may be correlated with cloudiness level and the consumption intensity of a skylight linked lighting circuit. In one example, a visibility level at which the consumption intensity of a skylight linked lighting circuit drops below the intensity threshold value, the visibility level may be determined as an interception point for switching from electric consumption to daylight utilization. Similarly, a visibility level at which the consumption intensity of a skylight linked lighting circuit is above the intensity threshold value, the visibility level may be determined as an interception point for switching from daylight utilization to electric consumption. In another example, skylight linked lighting circuit's run-hours data may be used with or without consumption of skylight linked lighting circuit to determine interception points.

Similarly, in order to determine the interception point for the cloudiness level, the cloudiness level may be correlated with visibility level and the consumption intensity of a skylight linked lighting circuit. In one example, a cloudiness level at which the consumption intensity of a skylight linked lighting circuit drops below the intensity threshold value, the cloudiness level may be determined as an interception point for switching from electric consumption to daylight utilization. Similarly, a cloudiness level at which the consumption intensity of a skylight linked lighting circuit is above the intensity threshold value, the cloudiness level may be determined as an interception point for switching from daylight utilization to electric consumption. In another example, skylight linked lighting circuit's run hours data may be used with or without consumption of skylight linked lighting circuit to determine interception points.

In one embodiment, override data may be correlated with site configuration data 128, the site instrumentation data 130, or the ambient data 132 while determining interception points. In one embodiment, the interception points may be determined by retrieving the configured interception points from the site configuration data 128 stored in the memory 110.

In one embodiment, the interception points determined for the skylight linked lighting circuit in a site 104 may be compared with the interception points for skylight linked lighting circuits of peer sites in another site 104. In addition, the interception point determining module 120 may determine the interception points for each of the skylight-linked lighting circuits and the skylight linked consumption circuits. Also, the interception point determining module 120 may determine the variation in number of times and duration for which lighting run-hours or consumption circuits exhibit change due to day light utilization. In one embodiment, the interception point determining module 120 may also determine the extent of drop in the consumption intensity and consistency of the drop in the consumption intensity for various interception points.

In an embodiment, the current operating schedule of the skylight linked lighting circuit may be determined by monitoring the variation in at least one of consumption or lighting run hours based on the ambient data 132. The interception point determining module 120 may check if the skylights put into operation or not for complete duration where the interception point is conducive. If the timing of operation is not in line with the duration for which interception point is conducive, the duration of operation in which it is functioning with an overlap of interception thresholds will be determined as current operating schedule. In an example, consider that the visibility level is 80% and the cloudiness level is 20% from 8:00 a.m. to 4:00 p.m., both of which are within limits of identified interception points. Thus, the time window of 8:00 a.m. to 4:00 p.m. may be considered as an ideal operating duration for the skylight linked lighting circuit as the both visibility level and cloudiness levels are in accordance with the interception points. However, if the consumption intensity of the lighting circuit decreases between 10:00 a.m. to 3:00 p.m., the current operating schedule may be determined as 10:00 a.m. to 3:00 p.m. or other possibilities leading to duration mismatch such as deviations in skylight sensor, internal sensor reading levels are also verified.

In an embodiment, the interception point determining module 120 further tracks the pattern of variation in current operating schedule for at least one of seasonality trends, variation with other ambient parameters, sensor reading levels, days of week, variations between days, stocking activities, festivals, etc. Also, the information on current operating schedule and associated patterns may be used to form peer site clusters with similar control philosophies to arrive at benchmarking and improving the site effectiveness.

Further, the determination of the interception points and the current operating schedule may be validated by at least one of override data or comparison with cluster index site. The cluster index site is determined based on site characteristics such as location of site, nature of services offered, building type and dimensions, logics enabled, and dimmer/non-dimmer sites.

Upon determining the interception point and current operation schedule for the skylight linked lighting circuit, the optimum logic deriving module 122 may derive an optimum logic for the operation of skylight-linked lighting circuits. The optimum logic may include deriving an optimum operating schedule to adhere to the interception points configured for each skylight linked lighting circuit. In an example, consider that the current operating schedule of the skylight is 10:00 a.m. to 5:00 p.m. However, the time of day for which the conditions are conducive based on interception points for a skylight linked lighting circuit occurs may be different. For example, consider that the interception point (skylight sensor reading, visibility level, cloudiness level) for switching the skylight linked lighting circuit from electric consumption to daylight utilization is (50 Lux, 45%, 20%). The time of day at which the interception points may be reached may be 9:00 a.m. Similarly, consider that the interception point (skylight sensor reading, visibility level, cloudiness level) for switching the skylight linked lighting circuit from daylight utilization to electric consumption is (10 Lux, 15%, 70%). The time of day at which the interception points may be reached may be 4:00 p.m. Therefore, the optimum logic deriving module 122 may derive an optimum logic such that the operating schedule of the skylight is modified to 9:00 a.m. to 4:00 p.m.

In one embodiment, the optimum logic deriving module 122 may further consider one or more optimization parameters to derive the optimum logic. The one or more optimization parameters may comprise site configuration data 128, comparison with peer sites of same cluster, operational limitations of the skylight-linked lighting circuits, and industry benchmark which are identified based on nature of services offered, location of facility etc. The site configuration data 128 may specify optimum interception points and optimum current operating schedule for skylights 106 in a site 104. In one embodiment, the optimum logic for interception points and the current operating schedule may be derived by adopting the interception points and the current operating schedule of skylights 106 in a peer site. The peer site 104 may be identified based on ranking of a peer index assigned to each peer site of the site 104. The peer index of the site 104 may be determined based on location and distance between the sites 104 of the plurality of distributed sites. The ranking may be derived based on the similarity in the characteristics of each peer site. In one embodiment, historical data related to operational issues and corrective actions taken at site and peer sites may be used to determine an optimum logic. In another embodiment, the identification of operational limitations in the operation of the skylight linked lighting circuits may be used to derive the optimum logic. In an example, the operational limitations may include, but it is not limited to, deviation in skylight sensor readings and non-functional skylight sensors as identified in the circuit identifier 118. The deviation in the skylight sensor readings may be considered for deriving the interception point and the current operating schedule. For example, the skylight sensor readings of a peer site with similar site configuration data 128 may be used to derive the interception points and the current operating schedule. In addition to the site configuration data 128, comparison with peer sites, operational limitations of the skylight-linked lighting circuits, industry benchmark may be used to derive the interception points and the current operating schedule.

Upon determining the optimum logic of operation of one or more skylights 106, the deviation detector module 126 may detect deviations in the operation of the one or more skylights 106 by comparing a current operating logic with the optimum logic. The deviations may comprise error in sensor readings, malfunction in operation of the skylight linked lighting circuits even though the sensor readings are proper, deviation in operating schedule of the skylight, non-adherence to the interception points configured for a skylight linked lighting circuit, non-adherence to the interception points and schedule based on policy, and fluctuation in operation of the skylight linked lighting circuit. In addition, the deviations may also occur when variation in the consumption intensity of the skylight linked lighting circuit is observed but decrease in the consumption intensity of the skylight linked lighting circuit is not below a pre-defined threshold level, decrease in the consumption intensity of the skylight linked lighting circuit is less compared to decrease observed based on historical trends with similar ambient factors. Further, deviations may also occur when decrease in the consumption intensity of the skylight linked lighting circuit is not similar to decrease in peer facilities of similar characteristics. Also, the deviations might exist when inside lux levels are not maintained at all times, which may be due to skylights operating based only on schedule irrespective of skylight sensor levels.

In addition, the deviations may comprise variation in lighting run-hours associated with skylight linked lighting circuits independent of variation in the consumption intensity of the skylight linked lighting circuits. This may occur due to manual override in the operation of the skylights and manual or automatic triggers for cleaning or maintenance of the skylights. It may also occur in case of dimmer based operations. Such deviations and their patterns are tracked and reported.

Upon detecting the deviations, the optimizer 124 may generate at least an alert or a report corresponding to each deviation to optimize the operation of the one or more skylights. The alert may comprise an alert for auto correction, an alert for batch processing, and an alert for correction effectiveness. The alerts may be triggered to stakeholders corresponding to each deviation category. The report may comprise an enterprise performance report, a site performance report, and an asset performance report. Reports and alerts may be customized based on user. In an example, an alert may be generated for triggering cleaning of skylights.

In an embodiment, upon detecting the deviations, the optimizer 124 may identify one or more causes of the deviations by correlating the ambient data 132 with the site instrumentation data 130 and the site configuration data 128.

In one example, to identify the cause of the deviation, location or direction of the skylight sensor may be determined. The direction of the skylight sensor may be determined based on skylight sensor readings, the visibility level, and the cloudiness level. Further, another cause for deviation may be usage of an override schedule. The usage of an override schedule may be due to lack of proper intensity of light in a particular area in a site, which could be detected using the skylight sensor readings which in this case may not reach interception point. Also, if repeated instances of the above pattern are observed for the particular area in the site, the cause of override usage may be confirmed. In another example, override usage may be observed due to sensor mounting or placement issues. In another embodiment, the override usage may be detected if the interception point of the skylight sensor reading is low. Also, if the current operating schedule of the skylight linked lighting circuit is not synchronized with the interception points configured, then the overrides may be used to operate skylights.

In addition, variation in interception point may be identified as a cause for deviation by detecting a change or variation in configuration or changes during maintenance of the skylight 106. Also, the variation in interception point may be due to sensor errors and hence may be identified by detecting error in skylight sensor readings. Further, variation in consumption intensity of the lighting circuit may indicate cause of deviations from expected performance. These deviations could be due to other loads being tagged to the lighting circuit. Also, the variation in the consumption circuit may be due to meter errors. Moreover, the causes may comprise variation in lighting circuit status, malfunctioning in relay, a stuck contactor, wrong tagging, or the like.

After identifying the cause for the deviations, the optimizer 124 may derive a corrective action for each deviation and each of the predicted future deviations based on analysis of at least one of the one or more causes, the site configuration data 128, operational limitations of the skylight linked lighting circuits, historical data 136 related to the operation of the one or more skylights, comparison with peer sites, or corrective action database 136. The ambient data 132 may include, but is not limited to, skylight sensor readings, cloudiness level, and visibility level. In one example, based on skylight presence in a site 104, the dimensions of the skylights 106, spread of the skylights 106, building size, may be correlated to detect heat gain in the site 104 owing to usage of skylights 106. Further, a net heat gain in energy usage for the site 104 may be computed. If the net heat gain is high due to the heat gain caused by the skylights 106, the current operating schedule of the skylight 106 may be reduced to reduce discomfort caused in the site 104 due to excess heat gain. In one embodiment, the correlation may be used to determine maintenance costs.

In another example, the location of a skylight sensor implementing override usage may be determined based on skylight sensor readings and ambient data 132. The optimizer 124 may derive a corrective action to change the location of the skylight sensor and mounting direction of the skylight sensor.

Upon deriving the corrective action, the optimizer 124 may prioritize the corrective actions corresponding to the deviations based on at least one of quantum of deviation, cost associated with corrective action, or urgency of the corrective action. Further, the optimizer 124 may implement the corrective action corresponding to the deviations based on the prioritization to optimize the operation of the one or more skylights.

In one embodiment, the optimizer 124 may further optimize the operations of the one or more skylights 106 by analyzing ratio of building size and building type to skylight size, spread and type to determine issues such as oversizing and under sizing of skylights and high maintenance costs. The optimizer 124 may further correlate HVAC consumption and skylight usage to determine net heat gain due to skylights usage, predict possible sensor failures based on historical trends. Further, the optimizer may generate at least one of an alert and report corresponding to the oversizing and under sizing of skylights, net heat gain due to skylight usage, or possible sensor failures.

Figure 2:
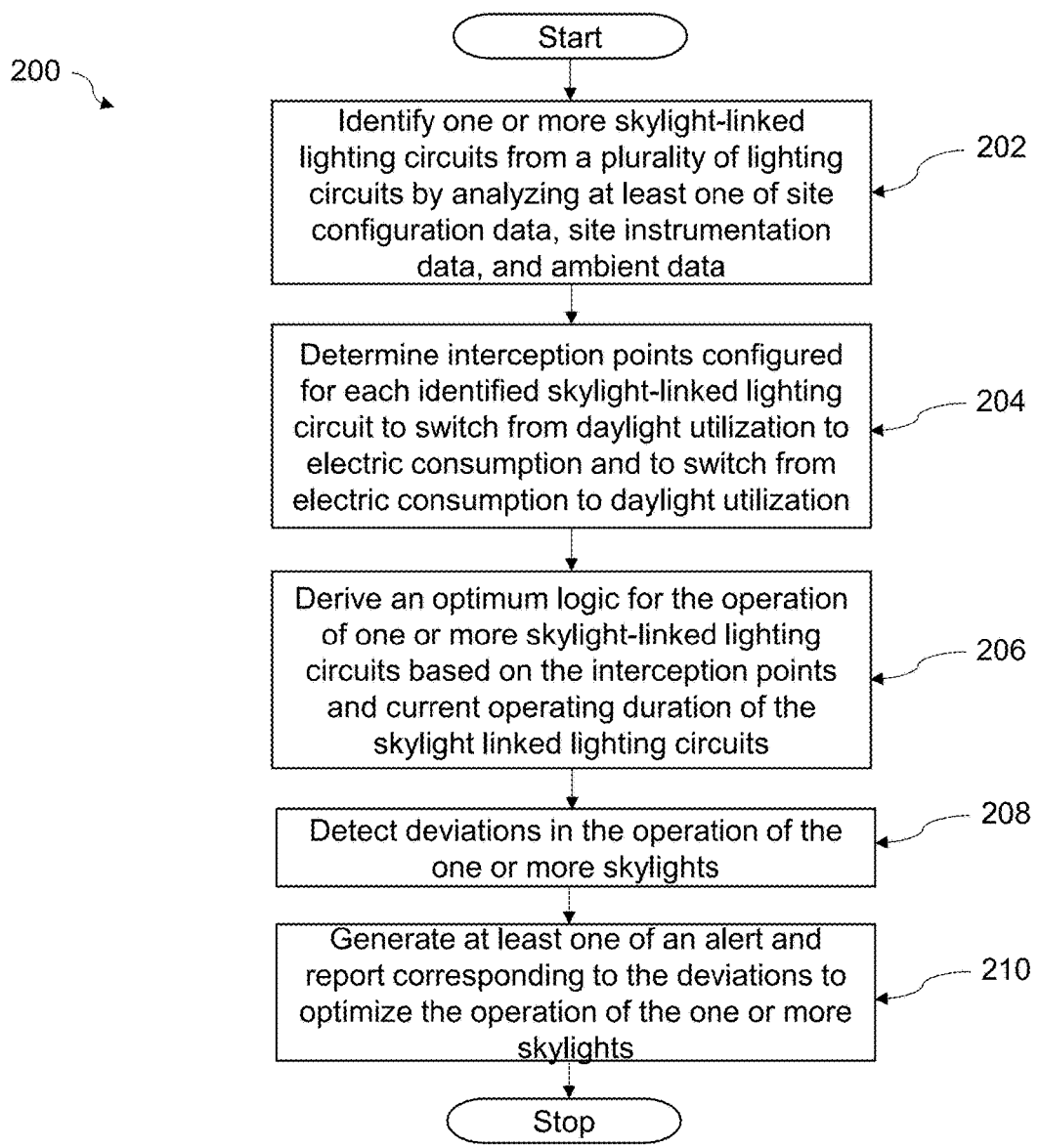
FIG. 2 is a flow diagram illustrating an example of a method for optimizing operation of one or more skylights to facilitate daylight harvesting, in accordance with some embodiments of the present disclosure.

FIG. 2 is a flow diagram illustrating a method 200 for optimizing the operation of one or more skylights to facilitate daylight harvesting, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202, one or more skylight-linked lighting circuits may be identified from a plurality of lighting circuits by analyzing at least one of site configuration data 128, site instrumentation data 130, or ambient data 132. The site instrumentation data 130 comprises run-hours data, lighting asset status data, lighting schedule, skylight sensor readings, dimmer presence, and consumption intensity of lighting circuit. The site configuration data 128 comprises lighting schedule, configured interception points, configured set points, and modulation of dimmers, and operating pattern of the skylight linked lighting circuits. The identification of the skylight-linked lighting circuits from a plurality of lighting circuits is explained in detail in conjunction with FIG. 1.

At block 204, interception points configured for each identified skylight-linked lighting circuit to switch from daylight utilization to electric consumption and to switch from electric consumption to daylight utilization may be determined. The interception points may be determined based on at least one of the site configuration data 128, the site instrumentation data 130, or the ambient data 132. The determining of the interception points is explained in detail in conjunction with FIG. 1.

At block 206, an optimum logic for the operation of one or more skylight linked lighting circuits may be derived based on the interception points and current operating schedule of the skylight linked lighting circuits. The optimum logic may be further derived based on one or more parameters, wherein the one or more parameters comprises site configuration details, comparison with peer sites, operational limitations of the skylight-linked lighting circuits, and industry benchmark. The deriving of the optimum logic is explained in detail in conjunction with FIG. 1.

At bock 208, deviations in the operation of the one or more skylights may be detected by comparing a current operating logic with the optimum logic. The deviations may comprise error in sensor readings, malfunction in operation of the skylight linked lighting circuits, deviation in operating duration of the skylight, non-adherence to the interception points configured for a skylight linked lighting circuit, and fluctuation in operation of the skylight linked lighting circuit. In addition, the deviations may also occur when variation in the consumption intensity of the skylight linked lighting circuit is observed but decrease in the consumption intensity of the skylight linked lighting circuit is not below a pre-defined threshold level, decrease in the consumption intensity of the skylight linked lighting circuit is less compared to decrease observed based on historical trends with similar ambient factors. Further, deviations may also occur when decrease in the consumption intensity of the skylight linked lighting circuit is not less compared to decrease compared to peer facilities of similar characteristics. The detection of the deviations is explained in detail in conjunction with FIG. 1. The detection of the deviations is explained in detail in conjunction with FIG. 1.

At block 210, at least one of an alert and report corresponding to one or more deviations may be generated upon detection of the deviations to optimize the operation of the one or more skylights. The generation of an alert or a report is explained in detail in conjunction with FIG. 1.

Figure 3:
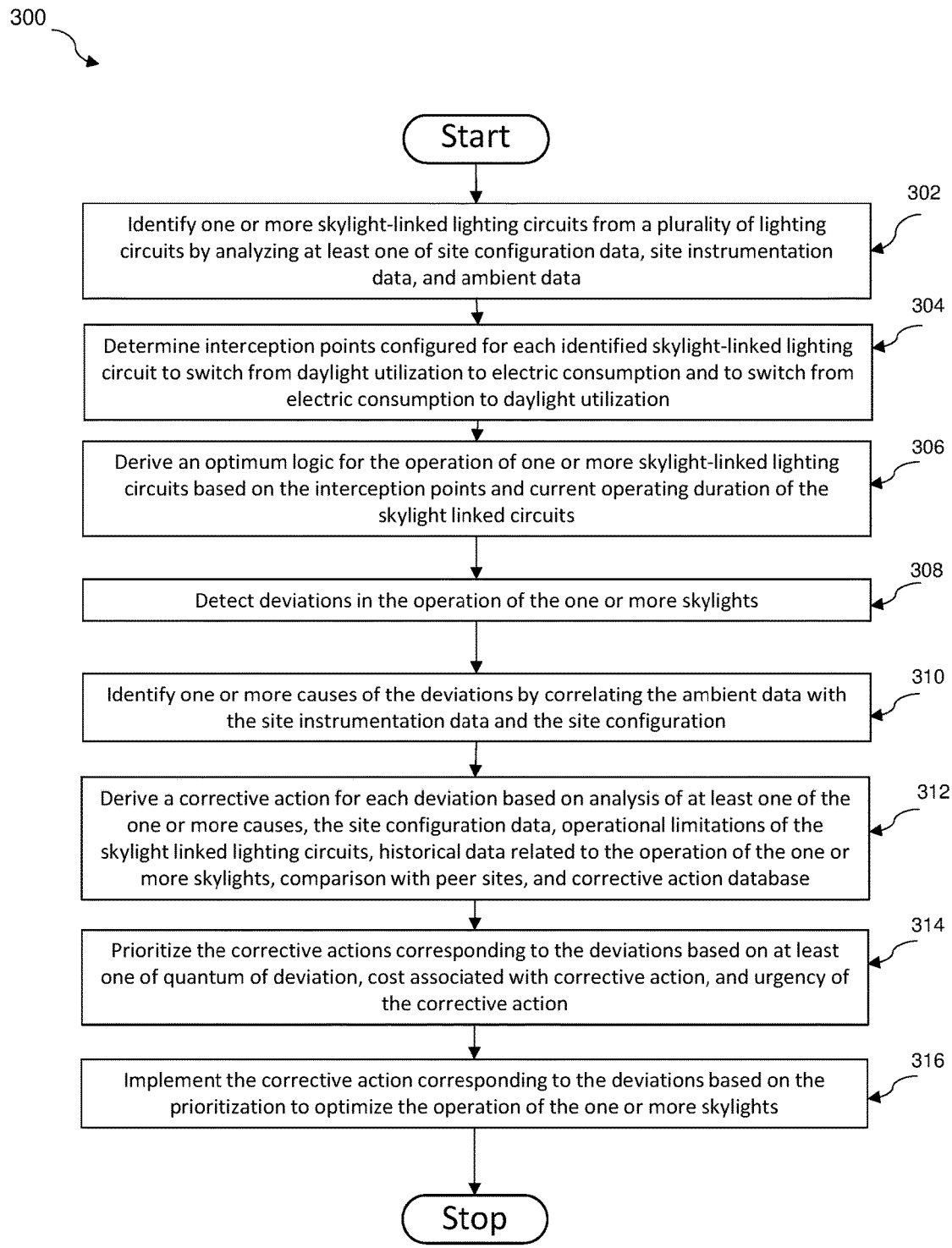
FIG. 3 is a flow diagram illustrating an example of another method for optimizing operation of one or more skylights to facilitate daylight harvesting, in accordance with some embodiments of the present disclosure.

FIG. 3 is a flow diagram illustrating another method 300 for optimizing the operation of one or more skylights to facilitate daylight harvesting, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

With reference to FIG. 3, at block 302, one or more skylight-linked lighting circuits may be identified from a plurality of lighting circuits by analyzing at least one of site configuration data 128, site instrumentation data 130, or ambient data 132. The site instrumentation data 130 comprises run-hours data, lighting asset status data, lighting schedule, skylight sensor readings, and consumption intensity of lighting circuit. The site configuration data 128 comprises lighting schedule, configured interception points, configured set points, dimmer presence and modulation of dimmers, and operating pattern of the skylight linked lighting circuits. The identification of the skylight-linked lighting circuits from a plurality of lighting circuits is explained in detail in conjunction with FIG. 1.

At block 304, interception points configured for each identified skylight-linked lighting circuit to switch from daylight utilization to electric consumption and to switch from electric consumption to daylight utilization may be determined. The interception points may be determined based on at least one of the site configuration data 128, the site instrumentation data 130, or the ambient data 132. The determining of the interception points is explained in detail in conjunction with FIG. 1.

At block 306, an optimum logic for the operation of one or more skylight linked lighting circuits may be derived based on the interception points and current operating schedule of the skylight linked lighting circuits. The optimum logic may be further derived based on one or more parameters, wherein the one or more parameters comprises site configuration details, comparison with peer sites, operational limitations of the skylight-linked lighting circuits, and industry benchmark. The deriving of the optimum logic is explained in detail in conjunction with FIG. 1.

At bock 308, deviations in the operation of the one or more skylights may be detected by comparing a current operating logic with the optimum logic. The deviations may comprise error in sensor readings, malfunction in operation of the skylight linked lighting circuits, deviation in operating duration of the skylight, non-adherence to the interception points configured for a skylight linked lighting circuit, and fluctuation in operation of the skylight linked lighting circuit. In addition, the deviations may also occur when variation in the consumption intensity of the skylight linked lighting circuit is observed but decrease in the consumption intensity of the skylight linked lighting circuit is not below a pre-defined threshold level, decrease in the consumption intensity of the skylight linked lighting circuit is less compared to decrease observed based on historical trends with similar ambient factors. Further, deviations may also occur when decrease in the consumption intensity of the skylight linked lighting circuit is not less compared to decrease compared to peer facilities of similar characteristics. The detection of the deviations is explained in detail in conjunction with FIG. 1.

At block 310, one or more causes of the deviations may be identified by correlating the ambient data 132 with the site instrumentation data 130 and the site configuration data 128. The identification of the one or more causes is explained in detail in conjunction with FIG. 1.

At block 312, a corrective action may be derived for each deviation based on analysis of at least one of the one or more causes, the site configuration data 128, operational limitations of the skylight linked lighting circuits, historical data related to the operation of the one or more skylights, comparison with peer sites, or corrective action database. The deriving of the corrective action is explained in detail in conjunction with FIG. 1.

At block 314, the corrective actions corresponding to the deviations may be prioritized based on at least one of quantum of deviation, cost associated with corrective action, or urgency of the corrective action. The prioritization of the corrective actions is explained in detail in conjunction with FIG. 1.

At block 316, the corrective action corresponding to the deviations may be implemented based on the prioritization to optimize the operation of the one or more skylights. The implementing of the corrective action is explained in detail in conjunction with FIG. 1.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

Computer System

Figure 4:
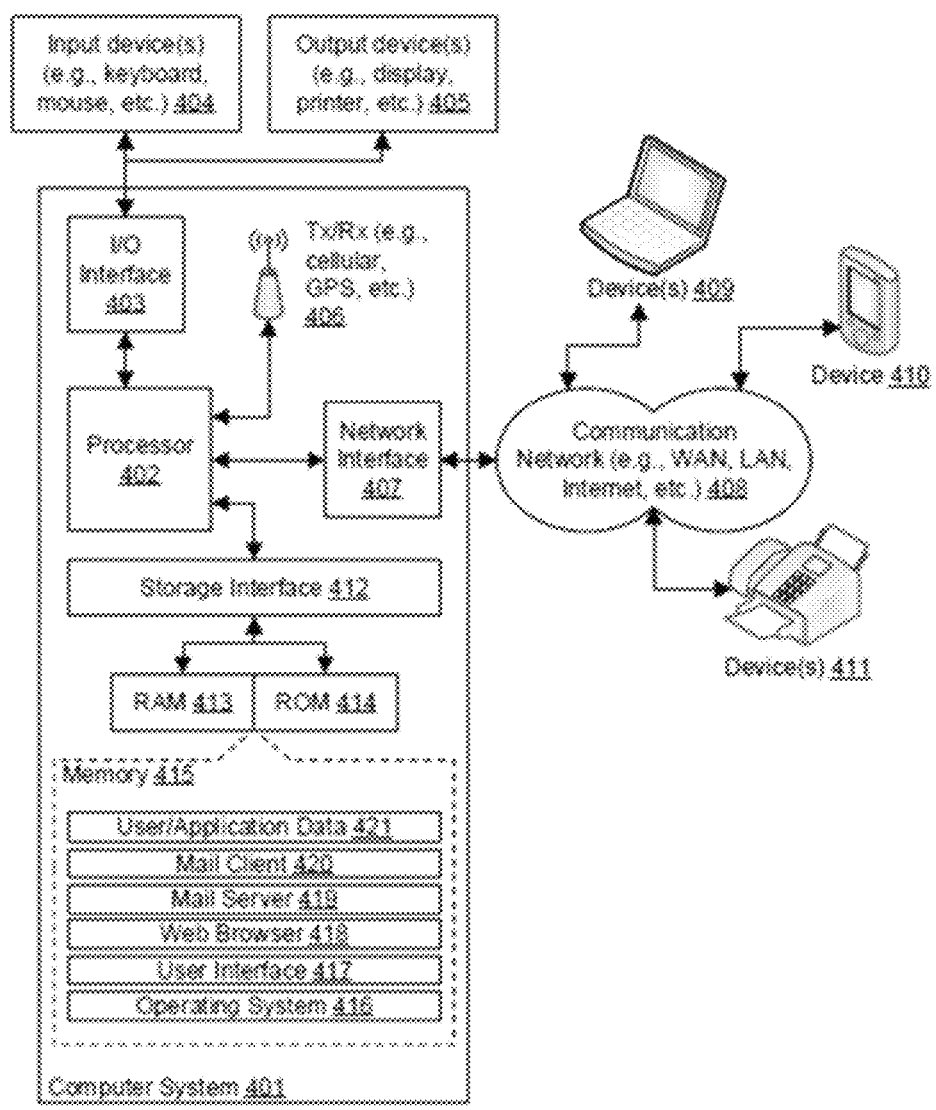
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the circuit identifier 118, the interception point determining module 120, the optimum logic deriving module 122, and the optimizer 124. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for optimizing the operation of the one or more skylights 106 in one or more distributed sites 104. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optimizing operation of one or more skylights of one or more distributed sites to facilitate daylight harvesting, the method comprising:

identifying, by a lighting control system, one or more skylight-linked lighting circuits from a plurality of lighting circuits by analyzing at least one of site configuration data, site instrumentation data, or ambient data;

determining, by the lighting control system, interception points configured for each identified skylight-linked lighting circuit to switch from daylight utilization to electric consumption and to switch from electric consumption to daylight utilization, wherein the interception points are determined based on at least one of the site configuration data, the site instrumentation data or the ambient data;

deriving, by the lighting control system, a second operation schedule for the operation of one or more skylight linked lighting circuits based on the interception points and current operation schedule of the skylight linked lighting circuits;

detecting, by the lighting control system, deviations in the operation of the one or more skylights based on the derived second operation schedule;

identifying, by the lighting control system, one or more causes of the deviations by correlating the ambient data with the site instrumentation data and the site configuration data;

deriving, by the lighting control system, a corrective action for each deviation based on analysis of at least one of the one or more causes, the site configuration data, operational limitations of the skylight linked lighting circuits, historical data related to the operation of the one or more skylights, comparison with peer sites, or corrective action database;

prioritizing, by the lighting control system, the corrective actions corresponding to the deviations based on a quantum of deviation or cost associated with the corrective action; and implementing, by the lighting control system, the corrective action corresponding to the deviations based on the prioritization to optimize the operation of the one or more skylights.

2. The method of claim 1 further comprising:
generating, by the lighting control system, at least one of an alert or a report corresponding to one or more deviations upon detection of the deviations to optimize the operation of the one or more skylights.

3. The method claim 1, wherein the one or more causes of the deviations are identified by comparing operation of the skylight linked lighting circuits of the one or more distributed sites.

4. The method of claim 1, wherein the site instrumentation data comprises run-hours data, lighting asset status data, a lighting schedule, skylight sensor readings data, dimmer presence and modulation of dimmers data, and consumption intensity of lighting circuit data.

5. The method of claim 1, wherein the site configuration data comprises a lighting schedule, configured interception points, configured set points, and an operating pattern of the skylight linked circuits.

6. The method of claim 1, wherein the identifying one or more skylight linked lighting circuits further comprises monitoring, by the lighting control system, variation in at least one of the consumption intensity of each lighting circuit, run-hours data and skylight sensor readings data based on the ambient data or the current operation schedule of the skylight.

7. The method of claim 1, wherein the second operation schedule is further derived based on site configuration data, comparison with peer sites, and operational limitations of the skylight-linked lighting circuits.

8. The method of claim 1, wherein the interception points comprises at least one of a visibility level, a cloudiness level, or skylight sensor readings data.

9. The method of claim 1, wherein the identifying one or more skylight linked circuits from a plurality of lighting circuits further comprises:
detecting, by the lighting control system, presence of the one or more skylights in a site based on analysis of at least one of the site configuration data, the site instrumentation data, the ambient data, site satellite images, or street view of the site; and
identifying, by the lighting control system, the one or more skylight linked lighting circuits from the plurality of lighting circuits corresponding to each skylight upon detecting presence of the one or more skylights.

10. The method of claim 9, wherein the detecting presence of the one or more skylights in the building further comprises:
verifying, by the lighting control system, skylight sensor readings data associated with the one or more skylights by correlating the skylight sensor readings data with at least one of cloudiness level, visibility level, sunset time, or sunrise time.

11. A lighting control system for optimizing operation of one or more skylights of one or more distributed sites to facilitate daylight harvesting, the lighting control system comprising:
a processor; and
a memory communicatively coupled to the processor, wherein the memory stores processor instructions, which on execution, causes the processor to:
identify one or more skylight-linked lighting circuits from a plurality of lighting circuits by analyzing at least one of site configuration data, site instrumentation data, or ambient data;
determine interception points configured for each identified skylight-linked lighting circuit to switch from daylight utilization to electric consumption and to switch from electric consumption to daylight utilization, wherein the interception points are determined based on at least one of the site configuration data, the site instrumentation data or the ambient data; and
derive an second operation schedule for the operation of one or more skylight linked lighting circuits based on the interception points and current operating schedule of the skylight linked lighting circuits;
detect deviations in the operation of the one or more skylights based on the derived second operation schedule;
identify one or more causes of the deviations by correlating the ambient data with the site instrumentation data and the site configuration data;
derive a corrective action for each deviation based on analysis of at least one of the one or more causes, the site configuration data, operational limitations of the skylight linked lighting circuits, historical data related to the operation of the one or more skylights, comparison with peer sites, or corrective action database;
prioritize the corrective actions corresponding to the deviations based on a quantum of deviation or cost associated with the corrective action; and
implement the corrective action corresponding to the deviations based on the prioritization to optimize the operation of the one or more skylights.

12. The lighting control system of claim 11, wherein the processor is further configured to:
generate at least one of an alert or report corresponding to one or more deviations upon detection of the deviations.

13. The lighting control system of claim 11, wherein the site instrumentation data comprises run-hours data, lighting asset status data, a lighting schedule, skylight sensor readings data, dimmer presence and modulation of dimmers data, and consumption intensity of lighting circuit data.

14. The lighting control system of claim 11, wherein the site configuration data comprises a lighting schedule, configured interception points, configured set points, and an operating pattern of the skylight linked lighting circuits.

15. The lighting control system of claim 11, wherein the processor is further configured to:
monitor variation in at least one of the consumption intensity of each lighting circuit, run-hours data or skylight sensor readings data based on the ambient data and the current operation schedule of the skylight to identify one or more skylight linked circuits.

16. The lighting control system of claim 11, wherein the second operation schedule is further derived based on one or more optimization parameters, wherein the one or more optimization parameters comprises site configuration data, comparison with peer sites, and operational limitations of the skylight-linked lighting circuits.

17. The lighting control system of claim 11, wherein the processor is configured to:
   detect presence of the one or more skylights is a site based on analysis of at least one of the site configuration data, the site instrumentation data, the ambient data, site satellite images, or street view of the site; and
   identify the one or more skylight linked lighting circuits from the plurality of lighting circuits corresponding to each skylight upon detection presence of the one or more skylights.

18. A non-transitory computer readable storage medium for optimizing operation of one or more skylights of one or more distributed sites to facilitate daylight harvesting, when executed by a computing device, cause the computing device to:
   identify one or more skylight-linked lighting circuits from a plurality of lighting circuits by analyzing at least one of site configuration data, site instrumentation data, or ambient data;
   determine interception points configured for each identified skylight-linked lighting circuit to switch from daylight utilization to electric consumption and to switch from electric consumption to daylight utilization, wherein the interception points are determined based on at least one of the site configuration data, the site instrumentation data or the ambient data; and
   derive an second operation schedule for the operation of one or more skylight linked lighting circuits based on the interception points and current operating schedule of the skylight linked lighting circuits;
   detect deviations in the operation of the one or more skylights based on the derived second operation schedule;
   identify one or more causes of the deviations by correlating the ambient data with the site instrumentation data and the site configuration data;
   derive a corrective action for each deviation based on analysis of at least one of the one or more causes, the site configuration data, operational limitations of the skylight linked lighting circuits, historical data related to the operation of the one or more skylights, comparison with peer sites, or corrective action database;
   prioritize the corrective actions corresponding to the deviations based on a quantum of deviation or cost associated with the corrective action; and
   implement the corrective action corresponding to the deviations based on the prioritization to optimize the operation of the one or more skylights.

* * * * *